(12) United States Patent
Forte et al.

(10) Patent No.: US 8,219,714 B2
(45) Date of Patent: Jul. 10, 2012

(54) STORAGE AREA NETWORK AND METHOD FOR PROVISIONING THEREIN

(75) Inventors: John Forte, Redwood City, CA (US); Sumit Gupta, Newark, CA (US)

(73) Assignee: Oracle America, Inc., Redwood City, CA (US)

( * ) Notice: Subject to any disclaimer, the term of this patent is extended or adjusted under 35 U.S.C. 154(b) by 629 days.

(21) Appl. No.: 12/236,552

(22) Filed: Sep. 24, 2008

(65) Prior Publication Data
US 2010/0077408 A1   Mar. 25, 2010

(51) Int. Cl.
G06F 3/00 (2006.01)
G06F 13/12 (2006.01)
G06F 13/00 (2006.01)

(52) U.S. Cl. ............ 710/2; 710/8; 710/36; 710/62; 711/100

(58) Field of Classification Search .......... None
See application file for complete search history.

(56) References Cited

U.S. PATENT DOCUMENTS

2007/0067591 A1* 3/2007 Shiraki et al. ............ 711/163
2010/0153612 A1* 6/2010 Zwisler et al. ............ 710/313

OTHER PUBLICATIONS

Storage Management Technical Specification, Part 3 Block Devices, Version 1.4.0, Revision 1, pp. 403-450, Dec. 21, 2007.

* cited by examiner

Primary Examiner — Alan Chen
(74) Attorney, Agent, or Firm — Brooks Kushman P.C.

(57) ABSTRACT

A storage array includes at least one target and a logical unit having a logical unit number. The storage array is configured to receive input defining a host group comprising at least one initiator and receive input defining a target group comprising the at least one target. The host group, target group and logical unit number define a view entry. The storage array is further configured to apply the view entry to the logical unit to provide a logical unit inventory that is provisioned for the at least one initiator.

15 Claims, 3 Drawing Sheets

STORAGE AREA NETWORK AND METHOD FOR PROVISIONING THEREIN

BACKGROUND

Small Computer System Interface (SCSI) is a set of standards for physically connecting and transferring data between computers and peripheral devices. The SCSI standards define commands, protocols, and electrical and optical interfaces. SCSI is most commonly used for hard disks and tape drives, but it can connect a wide range of other devices, including scanners and CD drives. The SCSI standards define command sets for specific peripheral device types.

SCSI is available in a variety of interfaces. Parallel SCSI (also called SPI) uses a parallel electrical bus design. Serial Attached SCSI (SAS) uses a serial point-to-point design but retains other aspects of the technology. iSCSI drops physical implementation entirely, and instead uses TCP/IP as a transport mechanism Several recent versions of SCSI, e.g., Serial Storage Architecture (SSA), Fibre Channel (FC), SAS, break from the traditional parallel SCSI standards and perform data transfer via serial communications. Serial SCSI may have a number of advantages over parallel SCSI: faster data rates, hot swapping (some but not all parallel SCSI interfaces support it), and improved fault isolation. A possible reason for the shift to serial interfaces is the clock skew issue of high speed parallel interfaces, which makes the faster variants of parallel SCSI susceptible to problems caused by cabling and termination. Serial SCSI devices, however, may be more expensive than their equivalent parallel SCSI devices.

SCSI interfaces have often been included on computers from manufacturers for use under various operating systems, either implemented on the motherboard or by means of plug-in adaptors.

In addition to many different hardware implementations, the SCSI standards also include a complex set of command protocol definitions. The SCSI command architecture was originally defined for parallel SCSI buses but has been carried forward with minimal change for use with iSCSI and serial SCSI.

In SCSI terminology, communication takes place between an initiator and a target. The initiator sends a command to the target which then responds. SCSI commands are sent in a Command Descriptor Block (CDB). The CDB consists of a one byte operation code followed by five or more bytes containing command-specific parameters. At the end of the command sequence, the target returns a Status Code byte which is usually 00 h for success, 02 h for an error (called a Check Condition), or 08 h for busy. When the target returns a Check Condition in response to a command, the initiator usually then issues a SCSI Request Sense command in order to obtain a Key Code Qualifier from the target. The Check Condition and Request Sense sequence involves a special SCSI protocol called a Contingent Allegiance Condition.

There are 4 categories of SCSI commands: N (non-data), W (writing data from initiator to target), R (reading data), and B (bidirectional). There are about 60 different SCSI commands in total.

Each device on a SCSI bus is assigned at least one Logical Unit Number (LUN). Simple devices may have just one LUN, more complex devices may have multiple LUNs. A "direct access," e.g., disk type, storage device may include a number of logical blocks, usually referred to by the term Logical Block Address (LBA). A typical LBA equates to 512 bytes of storage. Four different command variants are provided for reading and writing data. The Read(6) and Write(6) commands contain a 21-bit LBA address. The Read(10), Read (12), Read Long, Write(10), Write(12), and Write Long commands all contain a 32-bit LBA address plus various other parameter options.

A "sequential access," e.g., tape-type, device may not have a specific capacity because it typically depends on the length of the tape, which is not exactly known. Reads and writes on a sequential access device happen at the current position, not at a specific LBA. The block size on sequential access devices can either be fixed or variable, depending on the specific device. Tape devices, such as half-inch 9-track tape, DDS (4 mm tapes physically similar to DAT), Exabyte, etc., support variable block sizes.

SCSI uses a protocol method to transfer data between devices on the bus. It is a circular process which starts and ends in the same layer. From the first layer, all additional layers of protocol are executed before any data is transferred to or from another device and the layers of protocol are completed after the data has been transferred to the end of the process. The protocol layers are referred to as "SCSI bus phases." These phases are: Bus Free, Arbitration, Selection, Message Out, Command Out, Data Out/In, Status In, Message In and Reselection. The SCSI bus may be in only one phase at a given time.

In the modern SCSI transport protocols, there is an automated process of "discovery" of the IDs. For example, SSA initiators "walk the loop" to determine what devices are there and then assign each one a 7-bit "hop-count" value. FC initiators use the Loop Initialization Protocol to interrogate each device port for its World Wide Name (WWN). For iSCSI, because of the unlimited scope of the IP network, the process may be quite complicated. These discovery processes occur at power-on/initialization time and also if the bus topology changes later, for example if an extra device is added.

On a parallel SCSI bus, a device, e.g. host adapter, disk drive, is identified by a "SCSI ID," which is a number in the range 0-7 on a narrow bus and in the range 0-15 on a wide bus. Doing I/O to the adapter sets the SCSI ID. For example, the adapter often contains a BIOS program that runs when the computer boots up and that program has menus that let the operator choose the SCSI ID of the host adapter. Alternatively, the host adapter may come with software that is installed on the host computer to configure the SCSI ID. The traditional SCSI ID for a host adapter is 7, as that ID has the highest priority during bus arbitration (even on a 16 bit bus).

The SCSI ID of a device in a drive enclosure that has a backplane may be set either by jumpers or by the slot in the enclosure the device is installed into, depending on the model of the enclosure. In the latter case, each slot on the enclosure's back plane delivers control signals to the drive to select a unique SCSI ID. A SCSI enclosure without a backplane often has a switch for each drive to choose the drive's SCSI ID. The enclosure is packaged with connectors that are plugged into the drive where the jumpers are typically located. The switch emulates the necessary jumpers.

A SCSI target device, which may be called a "physical unit," is often divided into smaller "logical units." For example, a high-end disk subsystem may be a single SCSI device but contain dozens of individual disk drives, each of which is a logical unit. More commonly, virtual disk devices may be generated by the subsystem based on the storage in those physical drives, and each virtual disk device is a logical unit. The SCSI ID, WWN, etc. in this case identifies the whole subsystem, and a second number, the LUN identifies a disk device within the subsystem.

It is common to refer to the logical unit itself as a "LUN." Accordingly, the actual LUN may be called a "LUN number" or "LUN id."

SUMMARY

A storage area network includes a host and a storage array. The host includes at least one initiator. The storage array includes at least one target and a logical unit having a logical unit number. The storage array is configured to receive input defining a host group comprising the at least one initiator and receive input defining a target group comprising the at least one target. The host group, target group and logical unit number define a view entry. The storage array is also configured to apply the view entry to the logical unit to provide a logical unit inventory that is provisioned for the at least one initiator.

A method for provisioning a logical unit having a logical unit number to at least one initiator via at least one target in a storage area network includes defining a host group comprising the at least one initiator and defining a target group comprising the at least one target. The host group, target group and logical unit number define a view entry. The method also includes applying the view entry to the logical unit to provide a logical unit inventory that is provisioned for the at least one initiator.

A storage array includes at least one target and a logical unit having a logical unit number. The storage array is configured to receive input defining a host group comprising at least one initiator and receive input defining a target group comprising the at least one target. The host group, target group and logical unit number define a view entry. The storage array is also configured to apply the view entry to the logical unit to provide a logical unit inventory that is provisioned for the at least one initiator.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
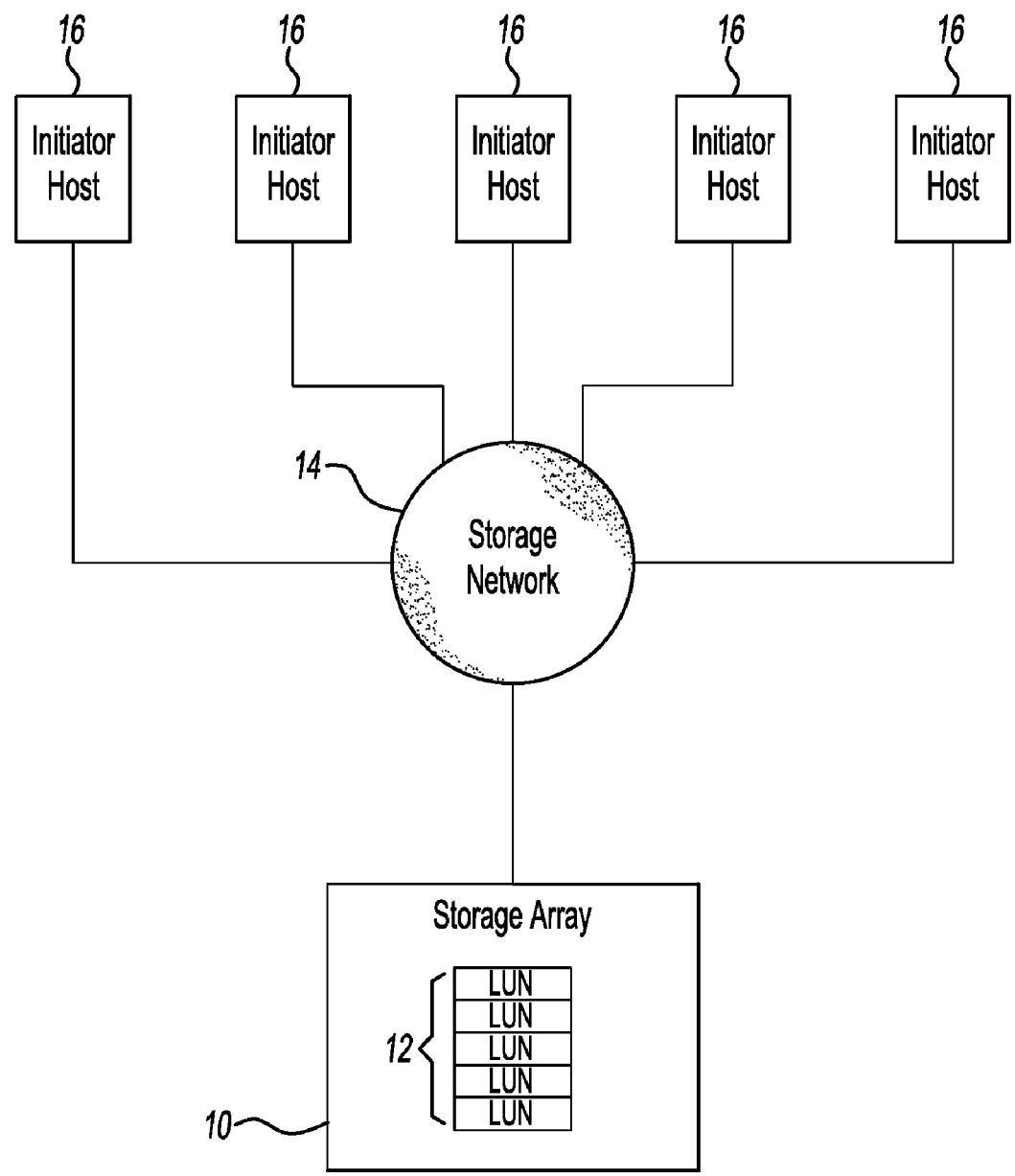
FIG. 1 is a schematic diagram of a storage array in communication with initiator hosts via a storage network.

Storage Management in Distributed and Heterogenous Storage Systems

Disk arrays may provide an interface for an administrator to specify which initiators may access what volumes through which target ports. The effect may be that the given volume is only visible to Small Computer System Interface (SCSI) commands that originate from the specified initiators through specific sets of target ports. There may also be a capability to select the SCSI Logical Unit Number (LUN) as seen by an initiator through a specific set of ports. The ability to limit access may be referred to as Device Masking. The ability to specify the device address seen by particular initiators may be referred to as Device Mapping. (For SCSI systems, these terms are known as LUN Masking and LUN Mapping.)

Given a storage system with no LUN Masking or Mapping, all hosts/initiators may see the same elements when they discover a storage system. In a storage system supporting LUN Masking, logical units may be masked (hidden) from SCSI initiators, e.g., Host Bus Adaptors (HBAs), by default. The administrator may use the Masking and Mapping sub-profile to determine which logical units are visible (exposed) to specific initiators through which target ports. The LUN Masking and Mapping interfaces may allow an administrator to customize the "view" of elements that are discovered. The effect may be that the real storage system appears to be a number of subsets—each subset exposing a view customized for a particular set of initiators.

A management model may be built on these views of a storage system—each view may be a subset of components the administrator exposes to certain hosts—and the classes that model the authorization and access rights.

A view may be a list of logical units exposed to a list of initiators through a list of target ports, modeled as a protocol controller with associated logical devices, hardware IDs and protocol endpoints. The logical devices may have LUNs and access permissions relative to the view. A full "path" may be a combination of a logical unit, initiator port and target port. The concept of path may be independent from a Common Information Model (CIM) model, but a view may express a combination of paths that comply with SCSI rules. In essence, a protocol controller may serve as a collection of paths—each initiator ID may be granted access to each logical unit through each target port.

Device Masking may limit the devices seen by particular host initiators (such as HBAs). For example, when a host discovers a device, it may see two of four logical devices, other hosts may see no logical devices, and yet other hosts may only see logical devices through a subset of target ports.

Device Mapping may allow the same logical device to be assigned a different LUN as seen by different host HBAs. This may allow, for example, each of four logical devices to appear to be logical unit zero to four different hosts.

COMSTAR

Common Multiprotocol SCSI TARget (COMSTAR) is a software framework that enables one to turn an OpenSolaris host into a SCSI target device that may be accessed over a storage network by initiator hosts. COMSTAR breaks down the task of handling a SCSI target subsystem into independent functional modules. These modules may then be attached to the SCSI TargetMode Framework (STMF).

Referring now to FIG. 1, an OpenSolaris host 10 including a plurality of LUNs 12 is configured as a storage array using COMSTAR. The OpenSolaris host 10 is connected to a storage network 14 and may be accessed by initiator hosts 16. The initiator hosts 16 may be of any platform: OpenSolaris, Solaris 10, Windows, Linux, VMware ESX, etc.

COMSTAR utilizes a STMF to manage target storage devices. The software stack includes port providers (plug-ins) that may implement various protocols (such as Fibre Channel (FC), iSCSI, etc.) and logical unit providers that emulate various SCSI devices, such as disk, tape and the like. A management library provides the management interface for COMSTAR through STMF.

The modules implementing functionality at the SCSI level (disk, tape, etc.) need not interact directly with the underlying transport. Likewise, the modules implementing the transport protocol, e.g., FC, iSCSI, etc., are not aware of the SCSI level functionality inherent in the packets they are transporting. This framework compartmentalizes the execution and cleanup of SCSI commands and the associated resources. This may simplify the task of writing SCSI or transport modules.

COMSTAR elements may be summarized as follows:

STMF—(i) Manages transactions, such as context and resources for SCSI command execution, and tracks logical unit and port providers; (ii) Handles LUN mappings and maskings, allocating memory, recovering failed operations, enumeration and other functions of an I/O stack; and (iii) Implements how initiators get the list of devices that have been provisioned for their use without any particular consideration given to the transport (That is, STMF does not care if the transport is iSCSI, FC, SAS, etc.)

Port providers—Provide local connection points for HBAs or built-in Network Interface Cards.

Logical unit providers—Implement the function of a SCSI logical unit, such as a tape, disk, Virtual Tape Library and the like.

Management library—Communicates with STMF and performs configuration tasks.

Storage Area Network View

As discussed above, SCSI logical unit mapping and masking is readily available on most, if not all, Redundant Array of Independent/Inexpensive Disk arrays for FC and iSCSI. Such mapping and masking techniques, however, may not be used generically across multiple transport protocols, e.g., FC, iSCSI, Serial Attached SCSI (SAS), etc.

The concept of view introduced above may be expanded by providing a basic building block structure in the form of, for example, a host group, target group and a logical unit number that may be used to compose a Storage Area Network (SAN) view for a given logical unit.

A discussed below, a method of representation for LUN Mapping and Masking across multiple (any SCSI capable) transport protocols is introduced. The object used to represent the Mapping and Masking may be referred to as a View Entry. A View Entry may include several elements: the Host Group, the Target Group and the LUN. This may provide implementors with a building block that may be used to compose a SAN view for a given logical unit.

The Host Group may be defined as a set of one or more initiators that have access to a logical unit, or are not "masked" from the logical unit, thereby having access. The Target Group may be defined as a set of one or more target ports through which the logical unit is exported. The LUN may be the 8-byte SCSI logical unit number by which the logical unit is referenced for a given initiator and target.

In order to facilitate the modeling of multiple transports, both Host Groups and Target Groups may utilize an identifier scheme as follows:

For FC and SAS initiators and targets, the identifier may, for example, be formatted as:

wwn.<WWN> where <WWN> is a string of 16 uppercase hexadecimal ASCII characters representing the World Wide Name of the initiator or target port. As an example, to represent a FC initiator port with a World Wide Name=0x0123456789abcdef, the identifier may be formatted as:

wwn.012346789ABCDEF

As another example, to represent a SAS target port with a World Wide Name=0x111111abba4612ef, the identifier may be formatted as:

wwn.111111ABBA4612EF

For iSCSI initiators and targets, the identifier may, for example, be a iSCSI Name as defined by "IETF RFC 3720 iSCSI." Therefore, the name may take on one of two formats. Either a name of type "iqn." or a name of type "eui." As an example, to represent a iSCSI target with type "iqn." name, the identifier may be formatted as:

iqn.1986-03.com.sun:01:e00000000000.46f7e262

As another example, to represent a iSCSI initiator with type "eui." name, the identifier be formatted as:

eui.02004567A425678D

Of course, other scenarios are also possible.

Multiple view entries may be assigned to a single logical unit in order to provide support for multiple host groups or multiple target groups to be associated with a single logical unit.

Figure 2:
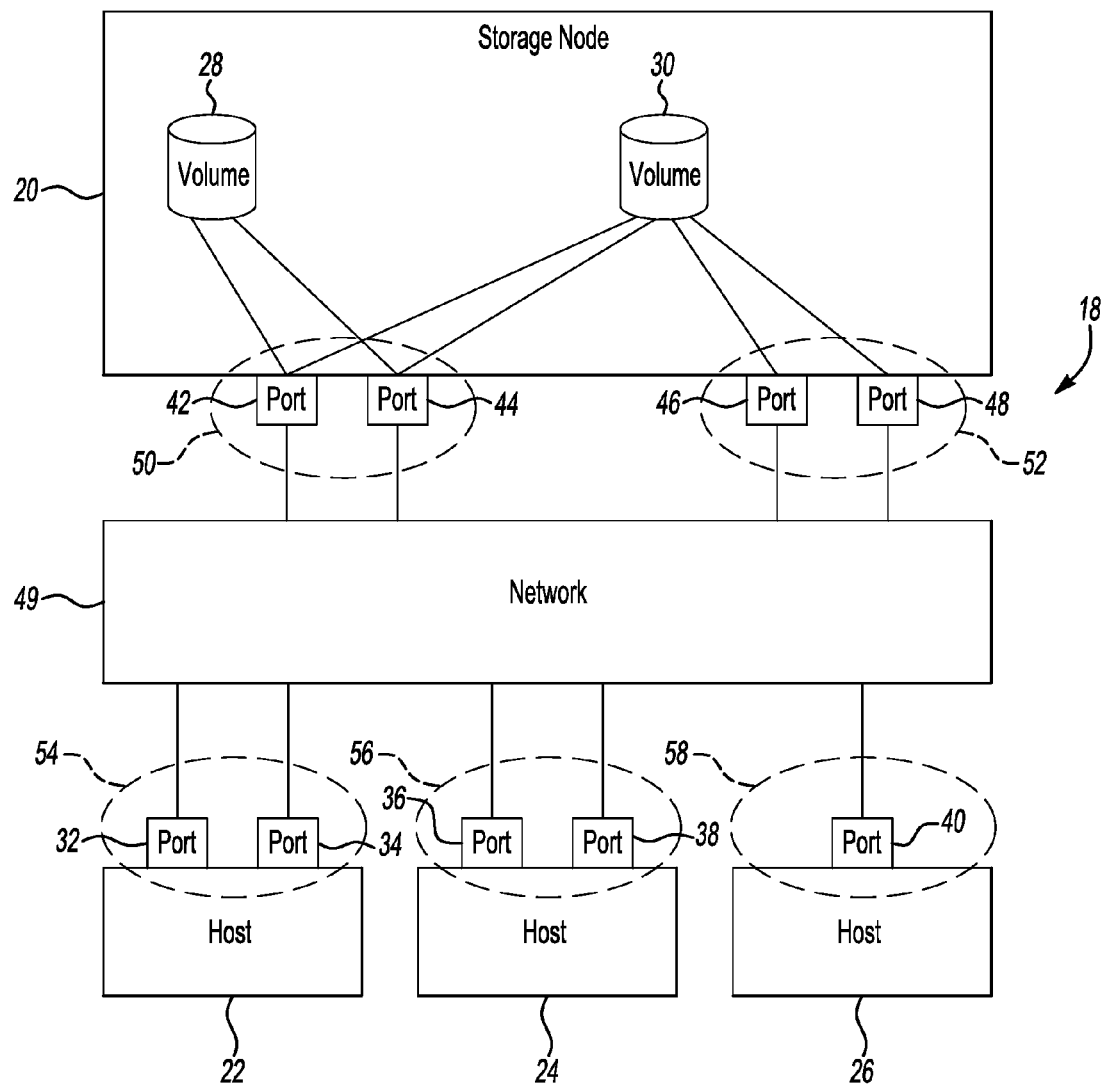
FIG. 2 is a block diagram of an embodiment of a storage area network according to an embodiment of the invention.

Referring now to FIG. 2, an embodiment of a storage area network 18 includes a storage node 20 and hosts 22, 24, 26. The storage node 20 includes volumes 28, 30. The volumes 28, 30 may be exported as SCSI block devices (also known as logical units). The host 22 has two initiator ports 32, 34. The host 24 has two initiator ports 36, 38. The host 26 has one initiator port 40. The storage node 20 has four available target ports 42, 44, 46, 48. The target ports 42, 44 may access the volume 28. The target ports 42, 44, 46, 48 may access the volume 48. The initiator ports 32, 34, 36, 38, 40 may communicate with the target ports 42, 44, 46, 48 via network 49. In other embodiments, other arrangements and configurations are also possible.

In one scenario, a first target group 50 is created to include the target ports 42, 44 and a second target group 52 is created to include the target ports 46, 48. Additionally, a first host group 54 is created to include the initiator ports 32, 34, a second host group 56 is created to include the initiator ports 36, 38, and a third host group 58 is created to include the initiator port 40. Other arrangements, however, are also possible.

Figure 3:
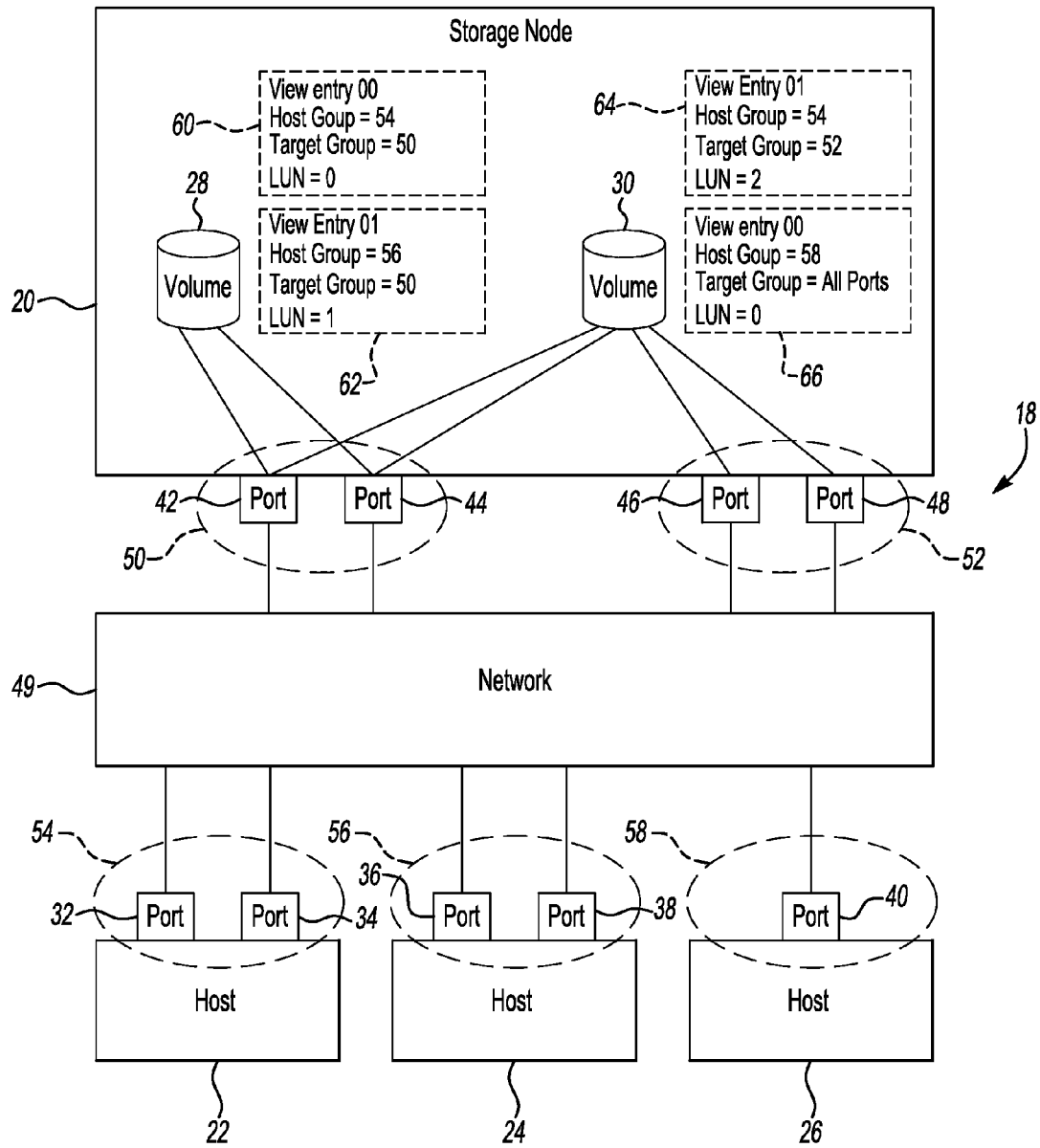
FIG. 3 is another block diagram of the storage area network of FIG. 2.

Referring now to FIG. 3, to make, for example, the logical unit 28 available to the hosts 22, 24, two view entries 60, 62 may be added to the logical unit 28. In the embodiment of FIG. 3, the view entry 60 is numbered "00" and has its host group set to the host group 54, its target group set to the target group 50, and its LUN set to zero. This allows the host 22 to access the logical unit 28. The view entry 62 is numbered "01" and has its host group set to the host group 56, its target group set to the target group 50, and its LUN set to one. This allows the host 24 to access the logical unit 28. As apparent to those of ordinary skill, the host 22 sees the logical unit 28 as LUN zero and the host 24 sees the logical unit 28 as LUN one.

To make, for example, the logical unit 30 available to the hosts 22, 26, two view entries 64, 66 may be added to the logical unit 30. In the embodiment of FIG. 3, the view entry 64 is numbered "01" and has its host group set to the host group 54, its target group set to the target group 52, and its LUN set to two. This allows the host 22 to access the logical unit 30. The view entry 66 is numbered "00" and has its host group set to the host group 58, its target group set to the target groups 50, 52, and its logical unit number set to zero. This allows the host 26 to access the logical unit 30. As apparent to those of ordinary skill, the host 22 sees the logical unit 30 as LUN two and the host 26 sees the logical unit 30 as LUN zero.

As described in the above example, the host 22 may access the volume 28 by way of the initiator ports 32, 34 and target ports 42, 44 and may access the volume 30 by way of the initiator ports 32, 34 and target ports 46, 48. The host 24 may access the volume 28 byway of the initiator ports 36, 38 and target ports 42, 44. The host 26 may access the volume 30 by way of the initiator port 40 and target ports 42, 44, 46, 48.

As an alternative, to make the logical unit 30 available to the host 26, two view entries could be added to the logical unit 30. The first alternative view entry may be numbered "00" and have its host group set to the host group 58, its target group set to the target group 50, and its LUN set to zero. The second alternative view entry may be numbered "02" and have its host group set to the host group 58, its target group set to the target group 52, and its LUN set to zero. Other arrangements and configurations are also possible.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A storage area network comprising:
a host including at least one initiator; and
a storage array including at least one target and a logical unit having a logical unit number, the storage array configured to (i) receive input defining a host group comprising the at least one initiator, (ii) receive input defining a target group comprising the at least one target and no initiators, wherein the host group, the target group and the logical unit number define a view entry and (iii) apply the view entry to the logical unit to provide a logical unit inventory that is provisioned for the at least one initiator.

2. The storage area network of claim 1 wherein the at least one initiator is Small Computer System Interface transport agnostic.

3. The storage area network of claim 1 wherein the at least one target is Small Computer System Interface transport agnostic.

4. The storage area network of claim 1 wherein the at least one initiator uses a first Small Computer System Interface transport and another initiator uses a second Small Computer System Interface transport different than the first Small Computer System Interface transport.

5. The storage area network of claim 1 wherein the at least one target uses a first Small Computer System Interface transport and another target uses a second Small Computer System Interface transport different than the first Small Computer System Interface transport.

6. A method for provisioning a logical unit having a logical unit number to at least one initiator via at least one target in a storage area network, the method comprising:
defining a host group comprising the at least one initiator;
defining a target group comprising the at least one target and no initiators, wherein the host group, the target group and the logical unit number define a view entry; and
applying the view entry to the logical unit to provide a logical unit inventory that is provisioned for the at least one initiator.

7. The method of claim 6 wherein the at least one initiator is Small Computer System Interface transport agnostic.

8. The method of claim 6 wherein the at least one target is Small Computer System Interface transport agnostic.

9. The method of claim 6 wherein the at least one initiator uses a first Small Computer System Interface transport and another initiator uses a second Small Computer System Interface transport different than the first Small Computer System Interface transport.

10. The method of claim 6 wherein the at least one target uses a first Small Computer System Interface transport and another target uses a second Small Computer System Interface transport different than the first Small Computer System Interface transport.

11. A storage array including at least one target and a logical unit having a logical unit number, the storage array configured to
receive input defining a host group comprising at least one initiator;
receive input defining a target group comprising the at least one target and no initiators, wherein the host group, the target group and the logical unit number define a view entry; and
apply the view entry to the logical unit to provide a logical unit inventory that is provisioned for the at least one initiator.

12. The storage array of claim 11 wherein the at least one initiator is Small Computer System Interface transport agnostic.

13. The storage array of claim 11 wherein the at least one target is Small Computer System Interface transport agnostic.

14. The storage array of claim 11 wherein the at least one initiator uses a first Small Computer System Interface transport and another initiator uses a second Small Computer System Interface transport different than the first Small Computer System Interface transport.

15. The storage array of claim 11 wherein the at least one target uses a first Small Computer System Interface transport and another target uses a second Small Computer System Interface transport different than the first Small Computer System Interface transport.

* * * * *